(12) United States Patent
Fangmeier

(10) Patent No.: US 7,389,791 B2
(45) Date of Patent: Jun. 24, 2008

(54) BACKFLOW PREVENTER

(75) Inventor: Martin Fangmeier, Auggen (DE)

(73) Assignee: Neoperl GmbH, Mullheim (DE)

(*) Notice: Subject to any disclaimer, the term of this patent is extended or adjusted under 35 U.S.C. 154(b) by 324 days.

(21) Appl. No.: 10/530,460

(22) PCT Filed: Dec. 5, 2003

(86) PCT No.: PCT/EP03/13768

§ 371 (c)(1), (2), (4) Date: Apr. 5, 2005

(87) PCT Pub. No.: WO2004/053368

PCT Pub. Date: Jun. 24, 2004

(65) Prior Publication Data

US 2006/0011238 A1 Jan. 19, 2006

(30) Foreign Application Priority Data

Dec. 10, 2002 (DE) .............................. 102 57 517

(51) Int. Cl.
*F16K 17/18* (2006.01)

(52) U.S. Cl. .................. 137/493.9; 137/860; 137/542

(58) Field of Classification Search ................ 137/860, 137/493.7, 493.9, 454.2, 454.4, 542
See application file for complete search history.

(56) References Cited

U.S. PATENT DOCUMENTS

| 3,056,423 | A | * | 10/1962 | Lieser ...................... 137/493.7 |
| 3,976,096 | A | | 8/1976 | Kass et al. |
| 5,494,069 | A | | 2/1996 | Bergmann |
| 2004/0074539 | A1 | | 4/2004 | Weis et al. |

FOREIGN PATENT DOCUMENTS

| DE | 201 05 498 | 9/2002 |
| DE | 101 15 588 | 10/2002 |
| JP | 08-277947 | 10/1996 |

* cited by examiner

*Primary Examiner*—John Rivell
(74) *Attorney, Agent, or Firm*—Volpe and Koenig, P.C.

(57) ABSTRACT

A backflow preventer (1) having a mounting housing (2) that is inserted into a fluid conduit (3) is provide and includes at least one sealing ring (4) which is supported within an annular groove (5) located on the outer circumference of the mounting housing (2) and has a sealing effect between the mounting housing (2) and the fluid conduit (3). The backflow preventer provides that the sealing ring (4) can be moved counter to a restoring force from a sealing position into a leakage position so as to compensate pressure when the backflow preventer (1) is closed and a fluid volume is sealed on the outflow side, thereby conteracting an excessive increase in internal pressure.

13 Claims, 2 Drawing Sheets

BACKFLOW PREVENTER

BACKGROUND

The present invention relates to a backflow prevention device having a mounting housing that can be inserted into a fluid conduit or line, as well as at least one sealing ring that is held in an annular groove provided on the outer circumference of the mounting housing and that provides a seal between the mounting housing and the fluid conduit.

Backflow prevention devices of this sort are used in gas lines, water lines, or similar supply lines in order to prevent the fluid from flowing back against the intended direction of flow. Thus, check valves are increasingly also being installed in water lines in order to counteract the penetration of contaminated water into the freshwater supply line in housing of a vacuum.

The use of check valves of this sort in the area of thermostat valves often has the problem that when the cold water side or warm water side is shut off, the water that is enclosed between the closed check valve on the one hand and the likewise closed valve seat on the other hand is strongly heated by external influences, and therefore increases in volume until system pressures arise that result in damages at the weakest part of the supply line, and thus in many cases at the check valve. Ultimately, this can result in a closing of the supply line, or a similarly undesirable cross-flow.

A check valve is already known that has, on the end surface of its closing element, a domed attachment having a lateral exit opening (see. WO 93/01435). The bypass channel leading to the exit opening of the attachment, which functions as a pressure relief valve, is closed by a valve sealing piece that is lifted when the internal pressure increases, opening the exit opening to the fluid flowing back through the bypass channel. However, a disadvantage here is that the known backflow prevention device has, in addition to the required seals on its housing circumference and on the valve seat of its check valve, an additional sealing zone in the area of the pressure relief valve, which can possibly result in functional failures. Also, because this pressure relief valve protrudes past the valve element of the check valve, the backflow prevention device known from WO 93/01435 cannot be used unproblematically with a flow regulator or with other sanitary insert parts connected immediately upstream at the flow inlet side.

SUMMARY

The object therefore arises of creating a constructively simple and low-maintenance backflow prevention device of the type named above that is distinguished by a standard, constant constructive length, but which nonetheless effectively counteracts an excessive increase in internal pressure.

In the backflow prevention device of the type named above, the solution according to the present invention to meet this objective is that the sealing ring can be moved against a restoring force from a sealing position into a leakage position in order to compensate pressure when the backflow prevention device is closed and a fluid volume is sealed at the flow outlet side.

In the backflow prevention device according to the present invention, the sealing ring typically required for the seal between the mounting housing and the fluid conduit simultaneously also acts as a pressure relief valve, so that to this extent an additional sealing zone, which could be susceptible to failure, can be omitted. Because this sealing ring is held on the outer circumference of the housing, and does not protrude past the valve element of the check valve, the backflow prevention device according to the present invention, having a standard constructive length, can also unproblematically be combined with a flow regulator or with another insert part connected immediately upstream at the flow inlet side. In this way, for pressure compensation the sealing ring can easily be moved against a restoring force from a sealing position into a leakage position, in which an excess pressure that may be present at the flow outlet side of the backflow prevention device is effectively dismantled until the restoring force moves the sealing ring back into its sealing position.

It is possible that the restoring force of at least one restoring spring acts on the sealing ring. However, a preferred specific embodiment according to the present invention, having a low manufacturing expense, provides that the restoring force of at least one rubber-like elastic restoring element acts on the sealing ring.

Here, it is advantageous if the at least one restoring element, which is effective due to its shape and/or material, has an annular construction.

The sealing ring and the restoring element can be fashioned as separate components held in the annular groove provided on the outer circumference of the case. However, a preferred development according to the present invention provides that the sealing ring and the at least one restoring element are connected in one-piece fashion with one another to form a sealing and restoring unit. Here, the sealing ring can be connected in one piece with a likewise annular restoring element, or, for example, can also have a plurality of formed-on elements at the flow inlet side that act as restoring elements.

It is especially advantageous if a ring guiding segment, encompassed by the sealing ring in the groove, is provided that tapers against the inflow direction of the backflow prevention device. While in its sealing position the sealing ring is pressed against the inner circumference of the liquid line in the partial area of the annular guide segment that is expanded at the flow outlet side, in the tapered partial area at the flow inlet side the sealing ring is held in its relaxed leakage position.

It is useful if the restoring element is supported on the radial wall of the groove at the flow inlet side in order to move the sealing ring in the restoring direction.

A preferred specific embodiment according to the present invention provides that the sealing ring can be moved from the sealing position into the leakage position by means of a backflow that acts on it. This backflow can flow from the flow outlet side of the backflow prevention device, between the housing external wall and the liquid line, until it reaches the sealing ring, in order there to move the sealing ring from its sealing position into the leakage position through pressure.

In order to enable rapid dissipation of an excess pressure acting at the flow outlet side of the backflow prevention device, it is advantageous if at least one pressure compensation channel is provided that connects the area of the groove situated before the leakage position in the inflow direction with the flow inlet side of the backflow prevention device. Here, a particularly simple and preferred specific embodiment according to the present invention provides that the at least one pressure compensation channel is fashioned as a slit or similar opening in the radial wall at the flow inlet side.

Additional features of the present invention result from the following description of exemplary embodiments according to the present invention in connection with the claims and the drawing. The individual features may be realized separately or in combination in a specific embodiment according to the present invention.

DETAILED DESCRIPTION OF THE PREFERRED EMBODIMENTS

Figure 1:
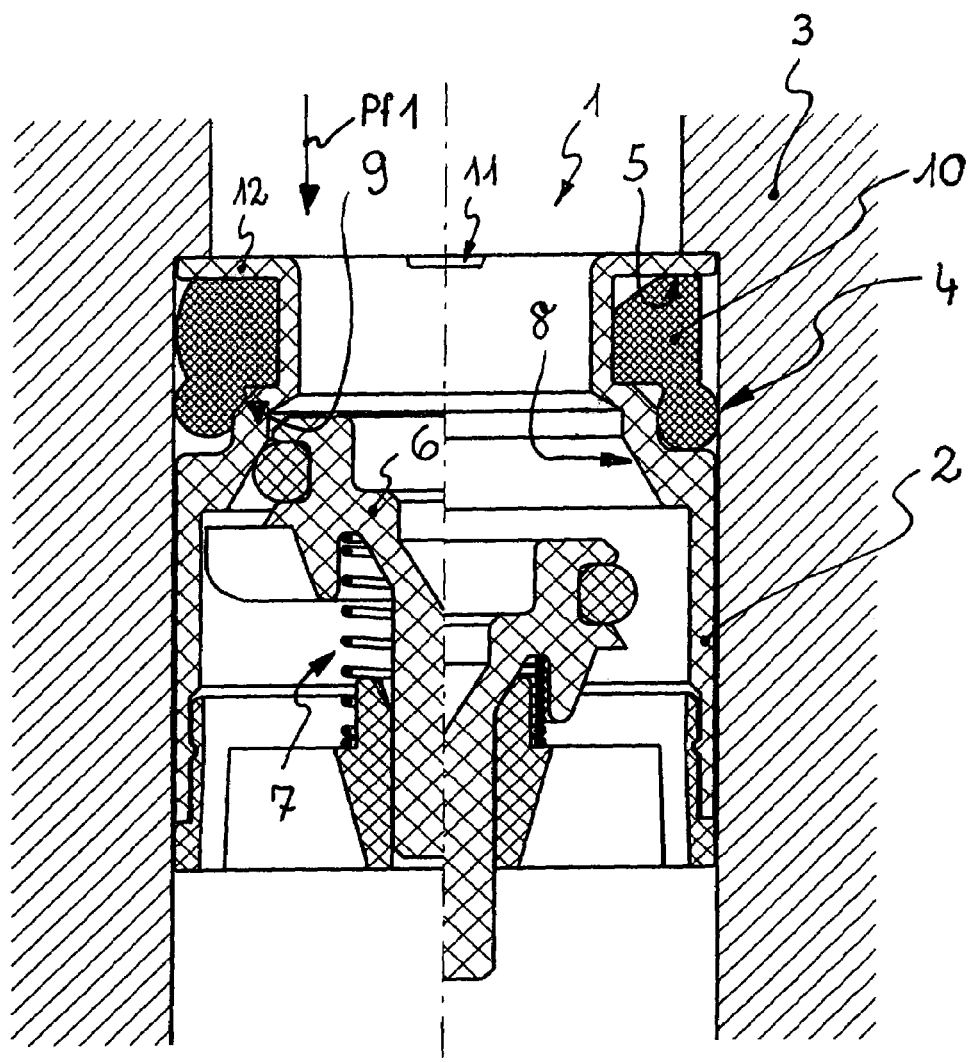
FIG. 1 shows a backflow prevention device with an excess pressure relief feature in a longitudinal section, a sealing ring providing a seal between the mounting housing of the backflow prevention device and a fluid conduit, said sealing ring being connected in one piece with a restoring element.

FIG. 1 shows the preferred embodiment of a backflow prevention device 1 that is placed with its mounting housing 2 into the housing receptacle of a fluid conduit, for example a liquid conduit 3. The backflow prevention device 1 has a sealing ring 4 that is held in an annular groove 5 provided on the outer circumference of the mounting housing 2 and that provides a seal between the mounting housing 2 and the liquid conduit 3.

The backflow prevention device 1 has a valve element 6. This valve element 6 can be moved against the force of a restoring spring 7 by the liquid pressure of a stream of liquid flowing in flow direction Pf1, from the closed position shown at left in FIG. 1 into the open position shown at right in FIG. 1. In contrast, the valve element 6 is moved into its closed position and is pressed against the valve seat 8 when a backflow acts on the valve element 6 against inflow direction Pf1.

If such a backflow prevention device 1 is used for example in the area of thermostat valves, there is a danger that the water that is enclosed between the backflow prevention device on the one hand and the likewise closed valve seat on the other hand when the cold water or warm water side is shut off will be heated by external influences to a point at which significant excess pressure arises that can damage a backflow prevention device of this sort, or other parts of the fluid conduit.

For this reason, for pressure compensation when depicted backflow prevention device 1 is closed and a fluid volume is sealed at the flow outlet side, the sealing ring 4 of the depicted backflow prevention device 1 can be moved from a sealing position into a leakage position against the restoring force of a rubber-like elastic restoring element 10. For this purpose, in the annular groove 5 an annular guide segment 9, encompassed by the sealing ring 4, is provided that tapers against the inflow direction Pf1 of the backflow prevention device 1. While the sealing ring 4 is pressed into its sealing position against the inner circumference of the liquid conduit 3 in the expanded partial area of annular guide segment 9 at the flow outlet side, the sealing ring 4 is held in its relaxed leakage position in the tapered partial area at the flow inlet side.

In FIG. 1, the leakage position of the sealing ring is shown at the left of the longitudinal center axis, and the sealing position of the sealing ring 4 is shown at the right of the longitudinal center axis.

The sealing ring 4 is moved from the sealing position into the leakage position by means of a backflow that acts on it, said backflow flowing from the flow outlet side of the backflow prevention device 1 between the housing outer wall and the conduit inner circumference to the sealing ring 4.

Figure 3:
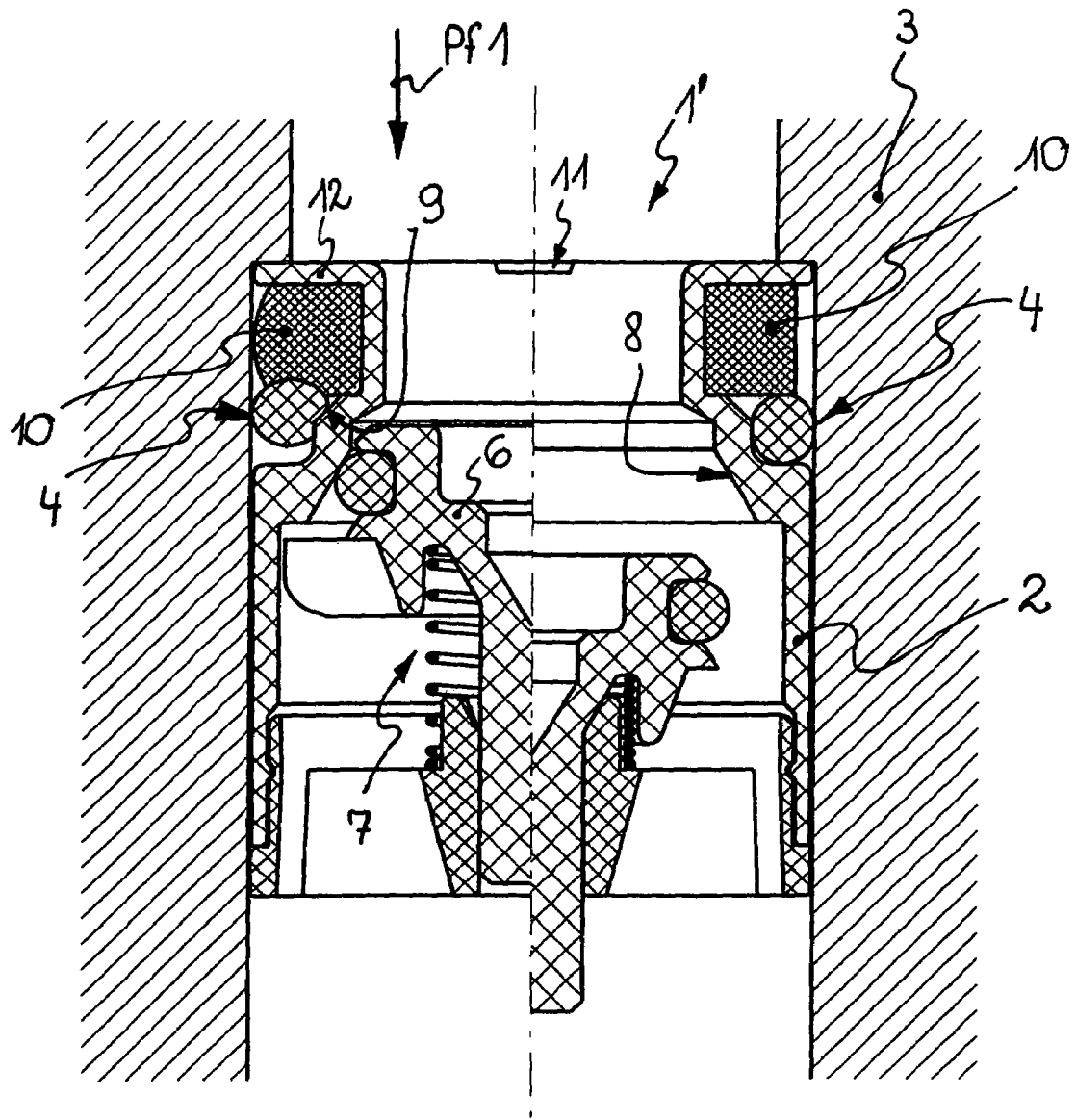
FIG. 3 shows a backflow prevention device comparable to that in FIGS. 1 and 2, in which, however, the sealing ring and the restoring element acting thereon are fashioned as separate components.

As is shown in the exemplary embodiment of a backflow prevention device 1' shown in FIG. 3, the sealing ring 4 and the restoring element 10 allocated thereto can also be fashioned as separate components. In the backflow prevention device 1 shown in FIG. 1, the sealing ring 4 and the restoring element 10 are however connected with one another in one piece to form a sealing and restoring unit. Here, the sealing ring and the likewise the annular restoring element 10 can also be fashioned as a multi-component injection-molded part. While a material component having a good sealing effect is selected for the sealing ring 4, for the restoring element 10 a material component having a high rubber-like elastic spring force is to be preferred.

Figure 2:
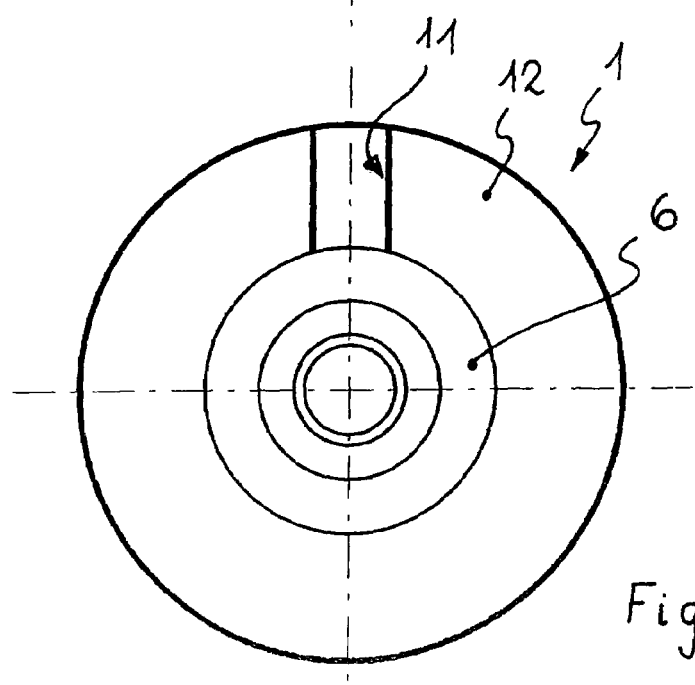
FIG. 2 shows the backflow prevention device from FIG. 1 in a top view of its flow inlet side.

In order to enable rapid dismantling of an excess pressure that may occur in the leakage position of the sealing ring 4, a pressure compensation channel 11 is provided that connects the area of the groove situated before the leakage position in the inflow direction Pf1 with the flow outlet side of the backflow prevention device 1. From FIG. 2, it is clear that pressure compensation channel 11 of the backflow prevention device 1 is fashioned as a slit in the radial wall 12 at the flow inlet side.

The backflow prevention devices 1, 1' shown here are distinguished by their constructively simple and comparatively low-maintenance design. Due to the constant, standard constructive length of these backflow prevention devices 1, 1', they can also be combined with other insert parts connected immediately upstream at the inflow side. The backflow prevention devices 1, 1' effectively counteract an excess increase of internal pressure, which could otherwise also have a damaging effect on the backflow prevention device 1, 1'.

The invention claimed is:

1. Backflow prevention device (1, 1'), comprising a mounting housing (2) that can be inserted into a fluid conduit (3), and having at least one sealing ring (4) that is held in an annular groove (5) provided on an outer circumference of the mounting housing (2) and that provides a seal between the mounting housing (2) and the fluid conduit (3), wherein when the backflow prevention device (1, 1') is closed and a fluid volume is sealed at a flow outlet side, the sealing ring (4) can be shifted axially in the groove against a restoring force from a sealing position into a leakage position in order to compensate pressure, and in the annular groove (5) an annular guide segment (9), encompassed by the sealing ring (4), is provided that tapers against an inflow direction (Pf1) of the backflow prevention device (1, 1') which does not contact the sealing ring in the sealing position.

2. Backflow prevention device according to claim 1, wherein the restoring force of at least one resilient elastic restoring element (10) acts on the sealing ring (4).

3. Backflow prevention device according to claim 2, wherein the at least one restoring element (10) has an annular construction.

4. Backflow prevention device according to claim 2, wherein the sealing ring (4) and the at least one restoring element (10) are connected with one another in one piece to form a sealing and restoring unit.

5. Backflow prevention device according to claim 1, wherein the sealing ring (4) can be moved from the sealing position into the leakage position by a backflow that acts thereon.

6. Backflow prevention device according to claim 1, wherein at least one pressure compensation channel (11) is provided that connects an area of the groove situated before the leakage position in the inflow direction (Pf1) to a flow inlet side of the backflow prevention device (1, 1').

7. Backflow prevention device according to claim 6, wherein the at least one pressure compensation channel (11) is fashioned as a slit or similar opening of the radial wall (12) at the flow inlet side.

8. Backflow prevention device according to claim 1, wherein the sealing ring protrudes radially beyond the mounting housing to contact an inner wall of the fluid conduit in which the backflow prevention device is inserted.

9. Backflow prevention device comprising a mounting housing (2) that can be inserted into a fluid conduit (3), and having at least one sealing ring (4) that is held in an annular groove (5) provided on an outer circumference of the mounting housing (2) and that provides a seal between the mounting housing (2) and the fluid conduit (3), wherein when the backflow prevention device (1, 1') is closed and a fluid volume is sealed at a flow outlet side, the sealing ring (4) can be shifted axially in the groove against a restoring force from a sealing position into a leakage position in order to compensate pressure wherein the restoring force of at least one resilient elastic restoring element (10) acts on the sealing ring (4), and the restoring element (10) is supported on a radial wall (12) located at a flow inlet side of the annular groove (5) and is a separate component from the sealing ring.

10. Backflow prevention device according to claim 9, wherein the annular groove includes a downstream section in a flow direction of the backflow prevention device with a first inside diameter in which the sealing ring is located in the sealing position, and an upstream section having a second inside diameter, that is smaller than the first inside diameter, in which the elastic restoring element is located in the sealing position.

11. Backflow prevention device of claim 10, further comprising an annular guide segment that tapers against an inflow direction of the backflow prevention device from the downstream section to the upstream section of the annular groove.

12. Backflow prevention device according to claim 10, wherein in the leakage position, the sealing ring shifts axially from the downstream section of the annular groove at least partially into the upstream section of the annular groove.

13. Backflow prevention device comprising a mounting housing (2) that can be inserted into a fluid conduit (3), and having at least one sealing ring (4) that is held in an annular groove (5) provided on an outer circumference of the mounting housing (2) and that provides a seal between the mounting housing (2) and the fluid conduit (3), wherein when the backflow prevention device (1, 1') is closed and a fluid volume is sealed at a flow outlet side, the sealing ring (4) can be shifted axially in the groove against a restoring force from a sealing position into a leakage position in order to compensate pressure, the restoring force of at least one resilient elastic restoring element (10) acts on the sealing, the annular groove includes a downstream section in a flow direction of the backflow prevention device with a first inside diameter in which the sealing ring is located in the sealing position, and an upstream section having a second inside diameter, that is smaller than the first inside diameter, in which the elastic restoring element is located in the sealing position wherein in the leakage position, the sealing ring shifts axially from the downstream section of the annular groove at least partially into the upstream section of the annular groove, further comprising an annular guide segment that tapers against an inflow direction of the backflow prevention device from the downstream section to the upstream section of the annular groove, and in the leakage position, the sealing ring shifts radially inwardly on the annular guide section.

* * * * *